(12) United States Patent
Kuwahara

(10) Patent No.: US 7,557,961 B2
(45) Date of Patent: Jul. 7, 2009

(54) METHOD FOR SETTING BOUNDARY VALUE, IMAGE SIGNAL PROCESSING METHOD AND APPARATUS, AND PRINTING APPARATUS

(75) Inventor: Soichi Kuwahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 771 days.

(21) Appl. No.: 11/070,172

(22) Filed: Mar. 2, 2005

(65) Prior Publication Data

US 2005/0200898 A1    Sep. 15, 2005

(30) Foreign Application Priority Data

Mar. 3, 2004    (JP) .............................. 2004-059899

(51) Int. Cl.
*H04N 1/405* (2006.01)

(52) U.S. Cl. .................... 358/3.03; 358/3.01; 358/3.02; 358/1.9; 358/1.1; 382/252; 382/251

(58) Field of Classification Search .................. 358/1.1, 358/1.9, 3.01, 3.03; 382/252
See application file for complete search history.

(56) References Cited

U.S. PATENT DOCUMENTS

| | | | | | |
|---|---|---|---|---|---|
| 5,313,309 | A | * | 5/1994 | Tai et al. ..................... | 358/3.21 |
| 5,642,202 | A | * | 6/1997 | Williams et al. ............. | 358/406 |
| 5,847,724 | A | * | 12/1998 | Mantell ........................ | 347/15 |
| 6,078,697 | A | * | 6/2000 | Ng ............................. | 382/275 |
| 6,249,357 | B1 | * | 6/2001 | Metcalfe et al. ............. | 358/451 |
| 6,462,838 | B1 | | 10/2002 | Hirata et al. | |
| 2003/0151773 | A1 | * | 8/2003 | Ogawa et al. ............... | 358/3.03 |
| 2003/0169455 | A1 | * | 9/2003 | Takahashi et al. .......... | 358/3.03 |
| 2006/0132867 | A1 | * | 6/2006 | Sugiyama et al. ........... | 358/504 |

FOREIGN PATENT DOCUMENTS

| | | |
|---|---|---|
| JP | 2 5683 | 1/1990 |
| JP | 6 125456 | 5/1994 |
| JP | 9 74484 | 3/1997 |
| JP | 9 139855 | 5/1997 |
| JP | 10 173944 | 6/1998 |
| JP | 11 17947 | 1/1999 |
| JP | 11 146205 | 5/1999 |
| JP | 11 268345 | 10/1999 |
| JP | 11 284856 | 10/1999 |
| JP | 11 331627 | 11/1999 |
| JP | 2001 260407 | 9/2001 |
| JP | 2002 125243 | 4/2002 |
| JP | 2002 252775 | 9/2002 |
| JP | 2003 152993 | 5/2003 |

* cited by examiner

*Primary Examiner*—Mark K Zimmerman
*Assistant Examiner*—Kent Yip
(74) *Attorney, Agent, or Firm*—Frommer Lawrence & Haug LLP; William S Frommer; Thomas F. Presson

(57) ABSTRACT

A method for setting a boundary value at a level of error diffusion, comprising a step of defining a characteristic curve on a coordinate plane defined by a first axis indicating a perceptually uniform scale and a second axis indicating gray-scale values of original data. The perceptually uniform scale is given by a normalized one of chromatic tristimulus values to the power of ⅓. A boundary value at a level of error diffusion is determined based on the characteristic curve and is stored in a storage device. The boundary value is read from the storage device for error diffusion processing, and error diffusion is performed on input image data using the read boundary value.

4 Claims, 10 Drawing Sheets

FIG. 1A

| Yellow | X | Y | Z |
|---|---|---|---|
| LEVEL 0 (WHITE) | 89.12911092 | 90.06981468 | 72.70553958 |
| LEVEL 1 | 77.90423442 | 84.52991655 | 21.72611425 |
| LEVEL 2 | 75.39239746 | 81.92159214 | 10.1096167 |
| LEVEL 3 | 74.24804678 | 79.80813707 | 6.173407531 |
| LEVEL 4 | 73.59992652 | 78.26335536 | 4.579008459 |
| LEVEL 5 | 73.07151581 | 76.74945825 | 3.605610947 |

FIG. 1B

| Magenta | X | Y | Z |
|---|---|---|---|
| LEVEL 0 (WHITE) | 89.12911092 | 90.06981468 | 72.70553958 |
| LEVEL 1 | 59.95260482 | 42.04656185 | 48.64025013 |
| LEVEL 2 | 48.17782888 | 27.39139749 | 36.39417032 |
| LEVEL 3 | 41.28825786 | 20.98472165 | 28.32865504 |
| LEVEL 4 | 37.31044497 | 18.11072442 | 23.57802591 |
| LEVEL 5 | 34.15357067 | 16.15034829 | 19.79361315 |

FIG. 1C

| Cyan | X | Y | Z |
|---|---|---|---|
| LEVEL 0 (WHITE) | 89.12911092 | 90.06981468 | 72.70553958 |
| LEVEL 1 | 35.82178086 | 46.21672397 | 64.46147624 |
| LEVEL 2 | 21.96288735 | 31.03488033 | 59.09095084 |
| LEVEL 3 | 16.85292894 | 23.48721731 | 54.73499898 |
| LEVEL 4 | 14.50061178 | 19.53277585 | 51.45563979 |
| LEVEL 5 | 12.65030682 | 16.21200595 | 48.26511869 |

FIG. 1D

| Black | X | Y | Z |
|---|---|---|---|
| LEVEL 0 (WHITE) | 89.12911092 | 90.06981468 | 72.70553958 |
| LEVEL 1 | 11.30516965 | 13.06173465 | 13.12594555 |
| LEVEL 2 | 2.173132954 | 2.781201745 | 3.43380291 |
| LEVEL 3 | 0.695742286 | 0.863476799 | 1.237690171 |
| LEVEL 4 | 0.472313821 | 0.535141163 | 0.811645646 |
| LEVEL 5 | 0.408918773 | 0.430989438 | 0.665767214 |

FIG. 2A

| Yellow | $Z^{\wedge}(1/3)$ | $Z^{\wedge}(1/3)-Z_0^{\wedge}(1/3)$ | PERCEPTUALLY UNIFORM SCALE |
|---|---|---|---|
| LEVEL 0 (WHITE) | 4.173712217 | 0 | 0 |
| LEVEL 1 | 2.790362883 | −1.383349334 | 0.523936914 |
| LEVEL 2 | 2.162278168 | −2.01143405 | 0.761820982 |
| LEVEL 3 | 1.834460293 | −2.339251925 | 0.885980427 |
| LEVEL 4 | 1.660569851 | −2.513142367 | 0.951840596 |
| LEVEL 5 | 1.533414696 | −2.640297521 | 1 |

FIG. 2B

| Magenta | $Y^{\wedge}(1/3)$ | $Y^{\wedge}(1/3)-Y_0^{\wedge}(1/3)$ | PERCEPTUALLY UNIFORM SCALE |
|---|---|---|---|
| LEVEL 0 (WHITE) | 4.482563217 | 0 | 0 |
| LEVEL 1 | 3.477310696 | −1.005252521 | 0.51423435 |
| LEVEL 2 | 3.014426715 | −1.468136502 | 0.751021464 |
| LEVEL 3 | 2.758254938 | −1.724308279 | 0.88206548 |
| LEVEL 4 | 2.626104118 | −1.856459099 | 0.949666893 |
| LEVEL 5 | 2.527710296 | −1.954852921 | 1 |

FIG. 2C

| Cyan | $X^{\wedge}(1/3)$ | $X^{\wedge}(1/3)-X_0^{\wedge}(1/3)$ | PERCEPTUALLY UNIFORM SCALE |
|---|---|---|---|
| LEVEL 0 (WHITE) | 4.466903031 | 0 | 0 |
| LEVEL 1 | 3.296469468 | −1.170433564 | 0.547739491 |
| LEVEL 2 | 2.800462821 | −1.66644021 | 0.779860678 |
| LEVEL 3 | 2.563845181 | −1.90305785 | 0.890593 |
| LEVEL 4 | 2.438533775 | −2.028369256 | 0.949236231 |
| LEVEL 5 | 2.330059545 | −2.136843486 | 1 |

FIG. 2D

| Black | $Y^{\wedge}(1/3)$ | $Y^{\wedge}(1/3)-Y_0^{\wedge}(1/3)$ | PERCEPTUALLY UNIFORM SCALE |
|---|---|---|---|
| LEVEL 0 (WHITE) | 4.482563217 | 0 | 0 |
| LEVEL 1 | 2.355050832 | −2.127512384 | 0.570807066 |
| LEVEL 2 | 1.406298449 | −3.076264768 | 0.825355321 |
| LEVEL 3 | 0.95224834 | −3.530314877 | 0.947176003 |
| LEVEL 4 | 0.811875531 | −3.670687686 | 0.98483773 |
| LEVEL 5 | 0.755362712 | −3.727200504 | 1 |

FIG. 6A

| Yellow | $Z^{\wedge}(1/3)$ | $Z^{\wedge}(1/3)-Z0^{\wedge}(1/3)$ | PERCEPTUALLY UNIFORM SCALE | NORMALIZED WITH LEVEL 5 BEING 255 | BOUNDARY VALUE FOR ERROR DIFFUSION |
|---|---|---|---|---|---|
| LEVEL 0 (WHITE) | 4.173712217 | 0 | 0 | 0 | 0 |
| LEVEL 1 | 2.790362883 | -1.383349334 | 0.523936914 | 133.603913 | 134 |
| LEVEL 2 | 2.162278168 | -2.01143405 | 0.761820982 | 194.2643503 | 194 |
| LEVEL 3 | 1.834460293 | -2.339251925 | 0.885980427 | 225.9250088 | 226 |
| LEVEL 4 | 1.660569851 | -2.513142367 | 0.951840596 | 242.719352 | 243 |
| LEVEL 5 | 1.533414696 | -2.640297521 | 1 | 255 | 255 |

FIG. 6B

| Magenta | $Y^{\wedge}(1/3)$ | $Y^{\wedge}(1/3)-Y0^{\wedge}(1/3)$ | PERCEPTUALLY UNIFORM SCALE | NORMALIZED WITH LEVEL 5 BEING 255 | BOUNDARY VALUE FOR ERROR DIFFUSION |
|---|---|---|---|---|---|
| LEVEL 0 (WHITE) | 4.482563217 | 0 | 0 | 0 | 0 |
| LEVEL 1 | 3.477310696 | -1.005252521 | 0.51423435 | 131.1297592 | 131 |
| LEVEL 2 | 3.014426715 | -1.468136502 | 0.751021464 | 191.5104732 | 192 |
| LEVEL 3 | 2.758254938 | -1.724308279 | 0.88206548 | 224.9266973 | 225 |
| LEVEL 4 | 2.626104118 | -1.856459099 | 0.949666893 | 242.1650576 | 242 |
| LEVEL 5 | 2.527710296 | -1.954852921 | 1 | 255 | 255 |

FIG. 6C

| Cyan | $X^{\wedge}(1/3)$ | $X^{\wedge}(1/3)-X0^{\wedge}(1/3)$ | PERCEPTUALLY UNIFORM SCALE | NORMALIZED WITH LEVEL 5 BEING 255 | BOUNDARY VALUE FOR ERROR DIFFUSION |
|---|---|---|---|---|---|
| LEVEL 0 (WHITE) | 4.466903031 | 0 | 0 | 0 | 0 |
| LEVEL 1 | 3.296469468 | -1.170433564 | 0.547739491 | 139.6735702 | 140 |
| LEVEL 2 | 2.800462821 | -1.66644021 | 0.779860678 | 198.8644729 | 199 |
| LEVEL 3 | 2.563845181 | -1.90305785 | 0.890593 | 227.101215 | 227 |
| LEVEL 4 | 2.438533775 | -2.028369256 | 0.949236231 | 242.0552388 | 242 |
| LEVEL 5 | 2.330059545 | -2.136843486 | 1 | 255 | 255 |

FIG. 6D

| Black | $Y^{\wedge}(1/3)$ | $Y^{\wedge}(1/3)-Y0^{\wedge}(1/3)$ | PERCEPTUALLY UNIFORM SCALE | NORMALIZED WITH LEVEL 5 BEING 255 | BOUNDARY VALUE FOR ERROR DIFFUSION |
|---|---|---|---|---|---|
| LEVEL 0 (WHITE) | 4.482563217 | 0 | 0 | 0 | 0 |
| LEVEL 1 | 2.355050832 | -2.127512384 | 0.570807066 | 145.5558018 | 146 |
| LEVEL 2 | 1.406298449 | -3.076264768 | 0.825355321 | 210.4656068 | 210 |
| LEVEL 3 | 0.95224834 | -3.530314877 | 0.947176003 | 241.5298808 | 242 |
| LEVEL 4 | 0.811875531 | -3.670687686 | 0.98483773 | 251.1336213 | 251 |
| LEVEL 5 | 0.755362712 | -3.727200504 | 1 | 255 | 255 |

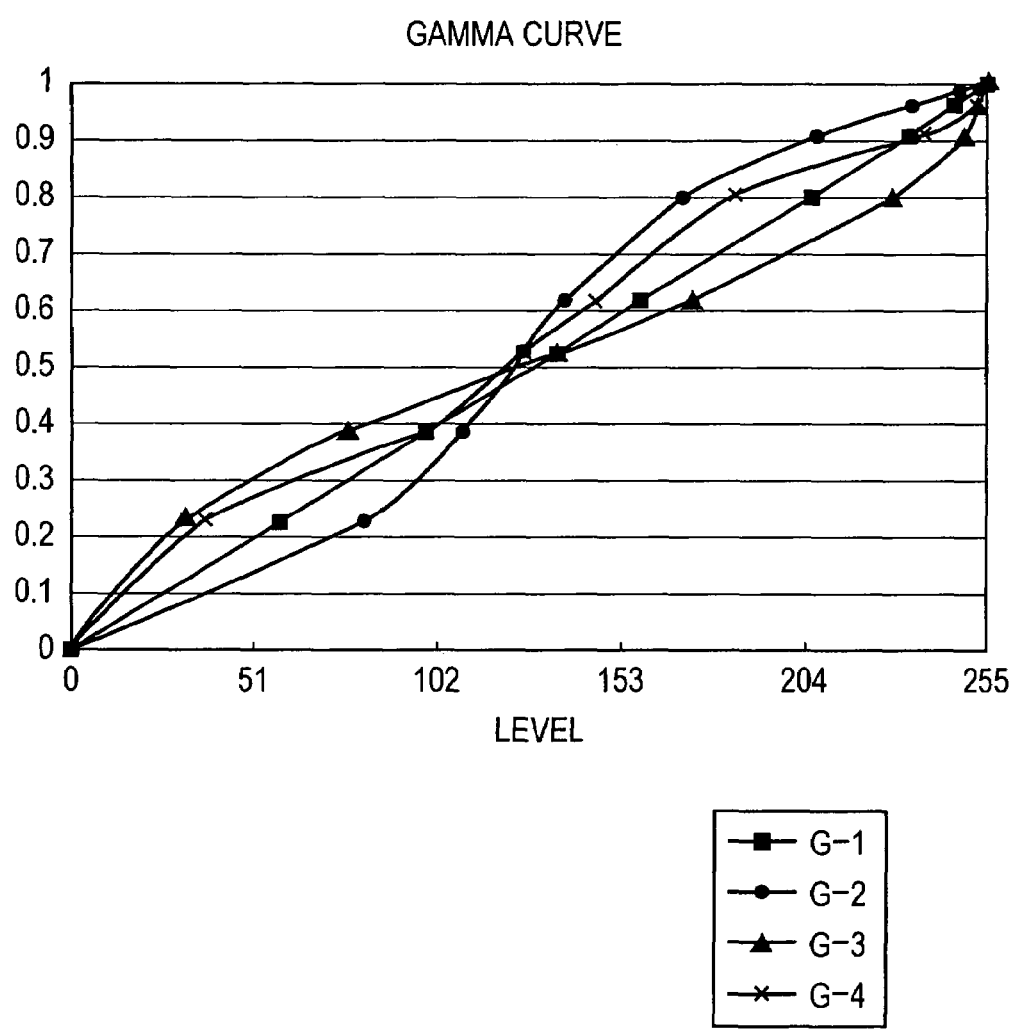

METHOD FOR SETTING BOUNDARY VALUE, IMAGE SIGNAL PROCESSING METHOD AND APPARATUS, AND PRINTING APPARATUS

BACKGROUND OF THE INVENTION

1. Field of the Invention

The present invention relates to a method for setting boundary values for error diffusion, and to an image signal processing method and apparatus using the boundary values set by the method. The present invention further relates to a printing apparatus employing the image processing technique.

2. Description of the Related Art

One conversion technique for multi-tone image data into data suitable for binary representation indicating the on and off states of each pixel is an error diffusion method. In the error diffusion method, density error caused in binarization is stored and used for processing neighboring pixels. The error diffusion method allows density information to be stored even after binarization. For example, approximately three to eight tonal levels per pixel can be stored.

Generally, in error-diffusing multi-tone image data, tones of the original image data are equally divided into multiple parts, and a boundary value for error diffusion is then determined. In this approach, the visual change from a non-printing state (level 0) to the first level (level 1) is larger than the visual change from level 1 to the second level (level 2).

If the visual change of tones between level 0 and level 1 and the visual change of tones between level 1 and level 2 are equivalently handled, the former visual change becomes greater than the latter visual change.

Likewise, the visual change of tones between level 1 and level 2 becomes greater than the visual change of tones between level 2 and level 3, and the visual change of tones between level 2 and level 3 becomes greater than the visual change of tones between level 3 and level 4.

For example, in a 256-grayscale (8-bit) image, stepped tones in a highlighted portion are more noticeable. One solution to this problem is disclosed in Floyd, R. and Steinberg, L., "An Adaptive Algorithm for Spatial Gray Scale," SID DIGEST, 1975. In this solution, the number of tones used for image processing is increased from 8 bits (256 tones) to 10 bits (1024 tones) or 12 bits (4096 tones) to reduce visual change of tones.

However, this method causes a high-density portion without substantial tonal difference to be finely divided more than necessary. Thus, a large memory capacity is required.

SUMMARY OF THE INVENTION

In view of the foregoing technical problems, the present invention provides a technique for ensuring inter-level perceptual uniformity of boundary values for error diffusion without increasing the memory capacity required for image processing.

In one aspect of the present invention, a method for setting a boundary value at a level of error diffusion includes defining a characteristic curve on a coordinate plane, the coordinate plane being defined by a first axis indicating a perceptually uniform scale and a second axis indicating grayscale values of original data, and determining a boundary value at a level of error diffusion based on the characteristic curve.

In another aspect of the present invention, an image signal processing method comprising the steps of reading a boundary value at a level of error diffusion from storing means, the boundary value being determined based on a characteristic curve defined on a coordinate plane, the coordinate plane being defined by a first axis indicating a perceptually uniform scale and a second axis indicating grayscale values of original data, and performing error diffusion on input image data using the read boundary value.

In another aspect of the present invention, an image signal processing apparatus includes a storage unit that stores a boundary value at a level of error diffusion, the boundary value being determined based on a characteristic curve defined on a coordinate plane, the coordinate plane being defined by a first axis indicating a perceptually uniform scale and a second axis indicating grayscale values of original data, and an error diffusion unit that error-diffuses input image data using the boundary value.

In another aspect of the present invention, a printing apparatus includes a storage unit that stores a boundary value at a level of error diffusion, the boundary value being determined based on a characteristic curve defined on a coordinate plane, the coordinate plane being defined by a first axis indicating a perceptually uniform scale and a second axis indicating grayscale values of original data, an error diffusion unit that error-diffuses input image data using the boundary value, and a printing device that prints an image corresponding to the error-diffused image data onto a printed medium.

BRIEF DESCRIPTION OF THE DRAWINGS

FIGS. 1A to 1D are tables showing chromatic tristimulus values of images obtained by printing patterns having evenly set boundary values as grayscale values;

FIGS. 2A to 2D are tables showing a procedure for determining a perceptually uniform scale;

FIGS. 6A to 6D are tables showing set boundary values;

FIG. 11 is a gamma curve as a modification of the characteristic curve.

DESCRIPTION OF THE PREFERRED EMBODIMENTS

Figure 3:
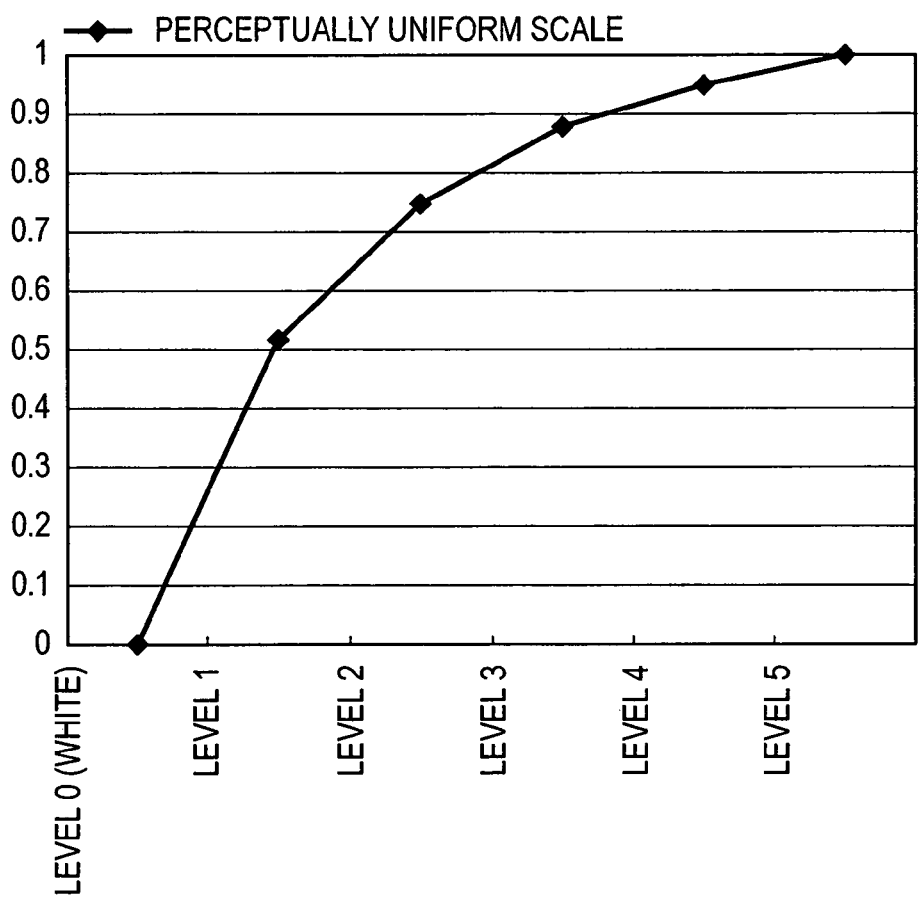
FIG. 3 is a graph showing the relationship between grayscale levels and the normalized values.

Embodiments of the present invention will now be described. Portions that are not specifically described or illustrated in this document or the drawings refer to the state of the art. The following embodiments are merely examples, and the present invention is not limited to these embodiments.

A method for setting boundary values in a case where input data D1 having 256 tones (0 to 255) is error-diffused to generate pixel data D2 having 6 levels (0 to 5) will now be described.

Typically, 256 tones are equally divided into five parts, and boundary values at these parts are used as boundary values for error diffusion. Specifically, 256 tones are equally divided into five tonal regions, i.e., "0 to 51", "51 to 102", "102 to 153", "153 to 204", and "204 to 255", and the values of the pixel data D2 are determined based on the tonal region to which the input data D1 belongs.

For example, input data D1 having a tone value given by the tonal region "0 to 51" is binarized by error diffusion into binary data "0" or "1". Input data D1 having a tone value given by the tonal region "51 to 102" is binarized by error diffusion into binary data "1" or "2". Input data D1 having a tone value given by the tonal region "102 to 153" is binarized by error diffusion into binary data "2" or "3". Input data D1 having a tone value given by the tonal region "153 to 204" is binarized by error diffusion into binary data "3" or "4". Input data D1 having a tone value given by the tonal region "204 to 255" is binarized by error diffusion into binary data "4" or "5".

A grid pattern has a certain area defined by a tone value defining a boundary value at each level, i.e., 51, 102, 153, 204, or 255. When the input data D1 defining these grid patterns is error-diffused, a grid pattern defined by the value "1" of the pixel data D2, a grid pattern defined by the value "2" of the pixel data D2, a grid pattern defined by the value "3" of the pixel data D2, a grid pattern defined by the value "4" of the pixel data D2, and a grid pattern defined by the value "5" of the pixel data D2 are obtained.

FIGS. 1A to 1D are tables of chromatic tristimulus values X, Y, and Z of images obtained by printing these grid patterns for each color (yellow, magenta, cyan, and black), respectively. FIGS. 2A to 2D show a procedure for determining a perceptually uniform scale for each color based on the values X, Y, and Z.

For yellow, Z to the power of 1/3 is calculated. For magenta and black, Y to the power of 1/3 is calculated. For cyan, X to the power of 1/3 is calculated. This calculation is shown in the second columns from the left in FIGS. 2A to 2D.

Then, the values at level 0, i.e., $X0^{(1/3)}$, $Y0^{(1/3)}$, and $Z0^{(1/3)}$, are subtracted from the values at the individual levels. This calculation is shown in the third columns from the left in FIGS. 2A to 2D. The resulting values are normalized with the value at level 5 for each color being "1". This calculation is shown in the rightmost columns in FIGS. 2A to 2D.

Thus, the values at the individual levels of the original data are transformed into values on the perceptually uniform scale. In this embodiment, the perceptually uniform scale is defined as a normalized one of X, Y, and Z to the power of 1/3.

FIG. 3 is a graph showing the relationship for magenta between the levels and the values on the perceptually uniform scale. In FIG. 3, the y-axis indicates the perceptually uniform scale (in this example, normalized Y to the power of 1/3), and the x-axis indicates the tonal level. As can be seen from FIG. 3, for magenta, the value on the perceptually uniform scale at level 1 is approximately half of that at level 5.

Generally, original data input to printers is composed of additive primary colors, i.e., red (R), green (G), and blue (B), irrespective of the printing method, and the printers print an image with cyan (C), magenta (M), yellow (Y), and black (K). It is therefore necessary to convert RGB data into CMYK data.

RGB data is converted into CMYK data using a three-dimensional (3D) lookup table. The conversion is typically performed assuming that a linear printer output characteristic curve is exhibited in a plot with the perceptually uniform scale, and further conversion is performed based on the actual printer output characteristic curve.

Figure 4:
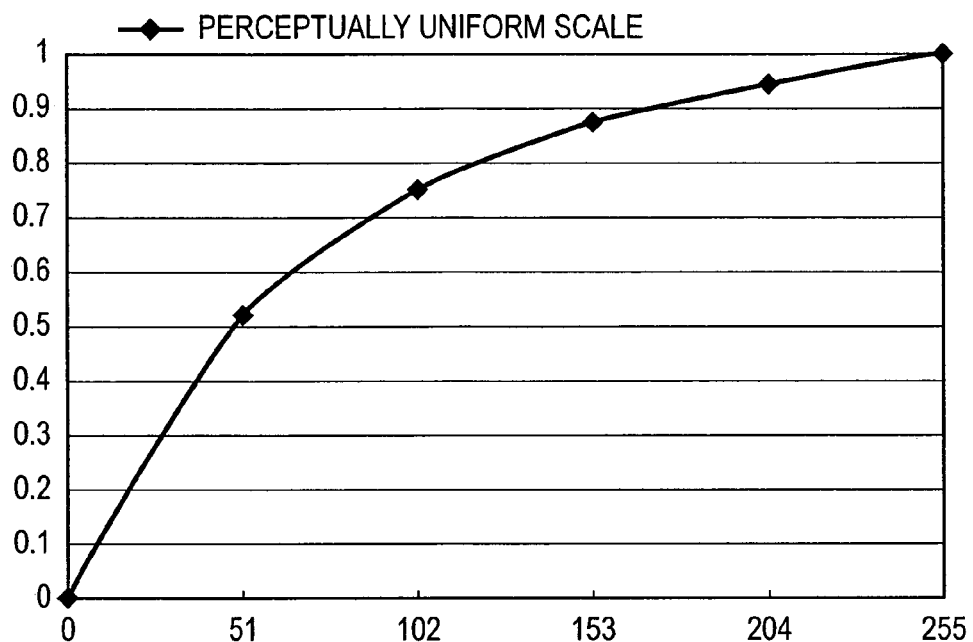
FIG. 4 is a printer input/output characteristic curve for magenta.
Figure 5:
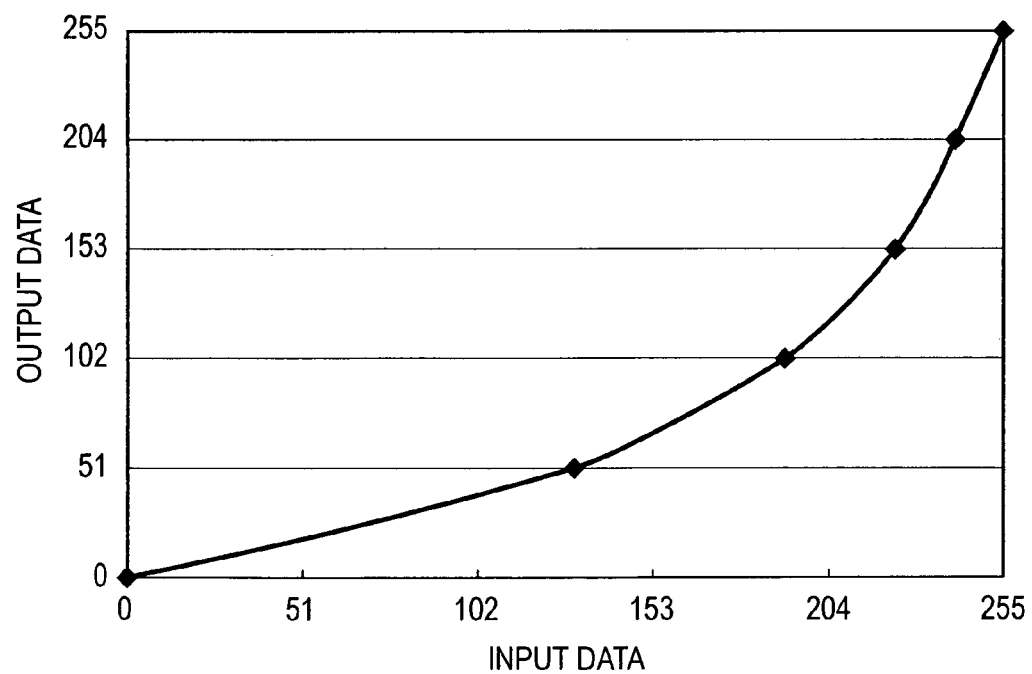
FIG. 5 is an input/output characteristic curve used for second conversion.

For example, a printer input/output characteristic curve for magenta shown in FIG. 4 is obtained. After first conversion under the assumption described above, second conversion (gamma correction) based on a characteristic curve shown in FIG. 5 is required. However, for example, the second conversion causes tonal compression of pixel data from "0 to 131" to "0 to 51" and tonal expansion of pixel data from "242 to 255" to "204 to 255".

Consequently, for example, a change of tones, which is to be converted into ascending tones "59", "60", "61", "62", "63", and "64", is converted into stepped tones "23", "23", "24", "24", "25", and "25". In this way, this typical method causes noticeably stepped tones, and impairs smooth tonal representation.

The present embodiment provides a method for determining a boundary value at a level of error diffusion in view of the problems with the typical method. In the method according to the present embodiment, boundary values at levels of error diffusion are determined so that the boundary values exhibit a substantially linear characteristic curve in a coordinate plane in which the y-axis indicates the perceptually uniform scale (i.e., a normalized one of X, Y, and Z to the power of 1/3) and the x-axis indicates tone values of the original data.

For convenience of comparison with the typical method, the same grid patterns are used. That is, a grid pattern defined by value "1" of the pixel data D2, a grid pattern defined by value "2" of the pixel data D2, a grid pattern defined by value "3" of the pixel data D2, a grid pattern defined by value "4" of the pixel data D2, and a grid pattern defined by value "5" of the pixel data D are used.

FIGS. 6A to 6D are tables of chromatic tristimulus values of images obtained by printing these grid patterns for each color (yellow, magenta, cyan, and black), respectively.

For each color, any one of the tristimulus values to the power of 1/3 is calculated. For example, for yellow, Z to the power of 1/3 is calculated. For magenta and black, Y to the power of 1/3 is calculated. For cyan, X to the power of 1/3 is calculated. This calculation is shown in the second columns from the left in FIGS. 6A to 6D.

Then, for each color, the values at level 0, i.e., $X0^{(1/3)}$, $Y0^{(1/3)}$, and $Z0^{(1/3)}$, are subtracted from the values at the individual levels. This calculation is shown in the third columns from the left in FIGS. 6A to 6D. The resulting values are normalized with the value at level 5 for each color being "1". This calculation is shown in the fourth columns from the left in FIGS. 6A to 6D.

Figure 7:
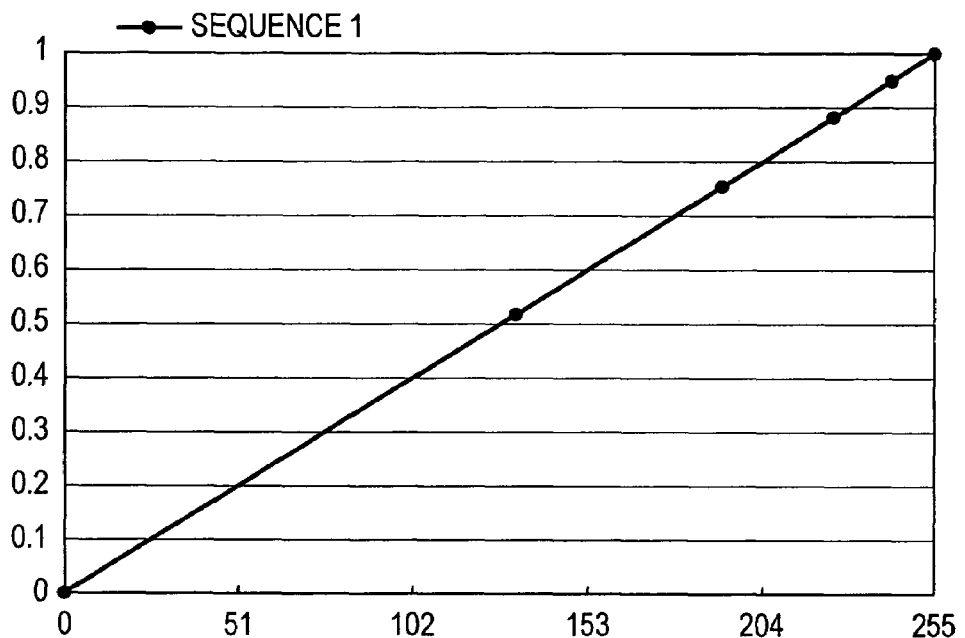
FIG. 7 is a printer input/output characteristic curve for magenta.

FIG. 7 shows a printer input/output characteristic for magenta. In FIG. 7, black circles indicate boundary values at the individual levels when the values are normalized with the values at level 5 being "1". As shown in FIG. 7, five boundary values are substantially linear (a deviation is caused by rounding).

Then, further normalization with the values at level 5 being "255" is performed. This calculation is shown in the second columns from the right in FIGS. 6A to 6D. All digits are rounded (e.g., rounded off) to the decimal point in the normalized values to determine boundary values at levels of error diffusion. This calculation is shown in the rightmost columns in FIGS. 6A to 6D.

Figure 8:
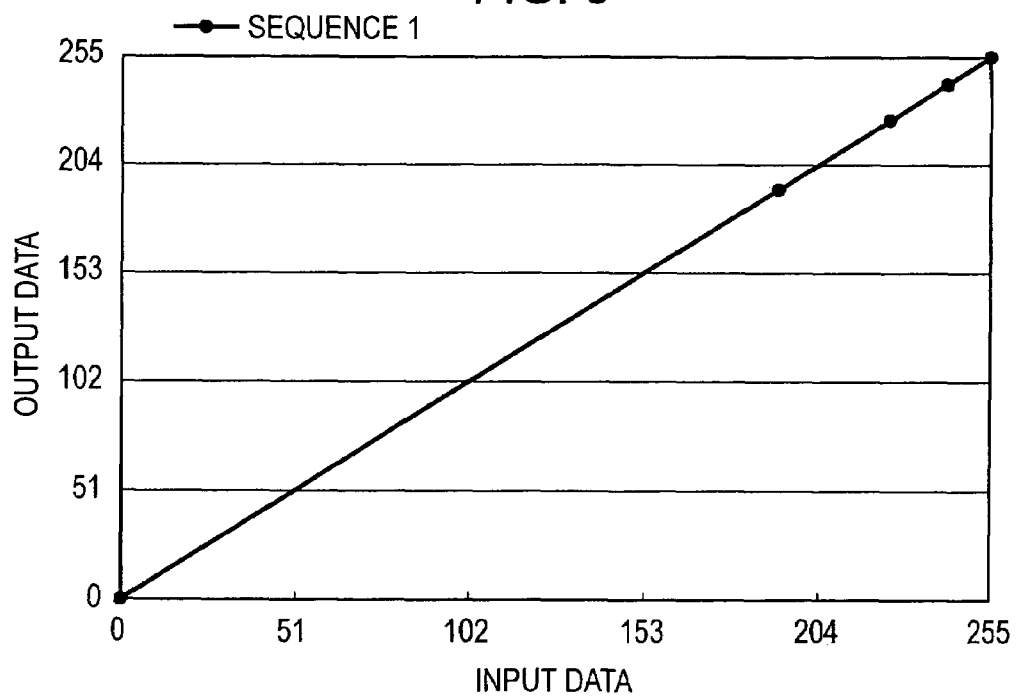
FIG. 8 is a printer input/output characteristic curve after second normalization.

FIG. 8 shows a printer input/output characteristic after the second normalization. As can be seen from the normalized input/output characteristic curve shown in FIG. 8, almost all values may be used without performing second conversion according to the actual printer input/output characteristic curve. That is, pixel data assigned "0 to 131" is allocated "0 to 131", and pixel data assigned "242 to 255" is allocated "242 to 255".

Consequently, a desired change of tones can be obtained. For example, a change of tones, which is to be converted into ascending tones "59", "60", "61", "62", "63", and "64", is converted into the desired order of tones, that is, "59", "60", "61", "62", "63", and "64". Once boundary values at levels of error diffusion are determined according to the present embodiment, the perceptual tonal difference in the boundary values between the levels before and after performing error diffusion can be stored. Therefore, error diffusion does not cause largely stepped tones, resulting in smooth tonal representation.

A printer that performs error diffusion using the boundary values determined by the method described above according to an embodiment of the present invention will now be described in the context of an ink jet printer. The printing apparatus according to the present invention is not limited to an ink jet printer, and may be a wire dot printer, a thermal transfer printer, or any other printing apparatus for use in printing in units of dots.

Figure 9:
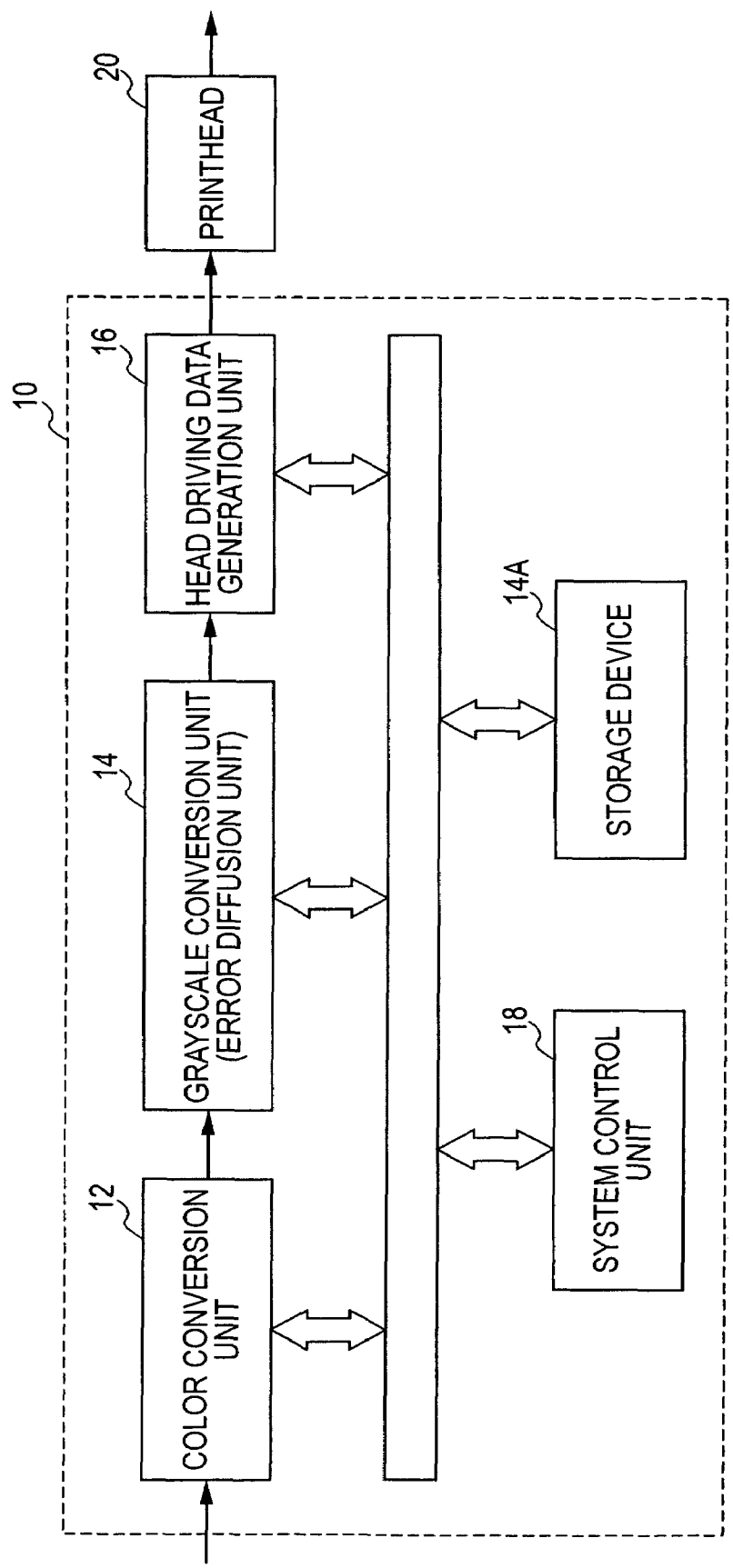
FIG. 9 is a block diagram of a printer according to an embodiment of the present invention.

FIG. 9 shows an ejection controller 10 disposed in the printer. The ejection controller 10 is a signal processor for converting print data obtained from inside or outside the printer into grayscale data suitable for ejecting ink droplets. The ejection controller 10 includes a color conversion unit 12, a grayscale conversion unit 14, a head driving data generation unit 16, and a system control unit 18.

The color conversion unit 12 converts print data composed of additive primary colors, i.e., red (R), green (G), and blue (B), into density signals for printer ink colors, i.e., cyan (C), magenta (M), yellow (Y), and black (K).

The converted density signals are supplied from the color conversion unit 12 to the grayscale conversion unit 14. The grayscale conversion unit 14 performs signal processing to reduce the number of tones of the density signals. The grayscale conversion unit 14 converts the density signals into grayscale data with a fewer tones while ensuring high reproducibility of mid-level tones of the original image. This conversion is performed using the error diffusion processing described above.

The grayscale conversion unit 14 reads boundary values at levels of error diffusion from a storage device 14A, and performs error diffusion according to a known procedure. The boundary values are determined by the method described above. The storage device 14A is, for example, a semiconductor memory, a magnetic storage medium, an optical storage medium, or any other storage medium.

The storage device 14A may be fixed to the printer or may be removable with respect to the printer. The storage device 14A may store information other than the boundary values, e.g., firmware of the printer, other programs, and setting information.

The head driving data generation unit 16 generates head driving data for actually driving a printhead 20. The printhead 20 is driven by the head driving data to eject ink droplets from ejection units.

The system control unit 18 controls the overall printer. For example, the system control unit 18 detects a printing mode, and controls the components according to the detected printing mode. The system control unit 18 further controls driving of a feeding mechanism. The system control unit 18 is configured by a computer for controlling the components according to predetermined firmware.

As described above, the ejection controller 10 does not need to perform gamma correction, which is essential to typical printers. Typical printers require gamma correction as pre-processing and/or post-processing of the grayscale conversion unit 14. The error diffusion processing used by the ejection controller 10 allows the same printer output characteristic curve (see FIGS. 7 and 8), and therefore gamma correction is not required as pre-processing and/or post-processing of the grayscale conversion unit 14.

The circuit structure of the ejection controller 10 can therefore be simpler than that of traditional printers. Moreover, gamma correction, which largely changes the input/output characteristic, is not performed, and more exact grayscale conversion to the original data can therefore be realized. Thus, a high-reproducibility printed image can be obtained.

The printer described above is configured such that print data supplied from inside or outside the printer is error-diffused by the printer itself. However, error diffusion may be performed by an apparatus separate from the printer, e.g., an image signal processing apparatus. For example, error diffusion may be used for applying various effects to an image or converting the image format.

Figure 10:
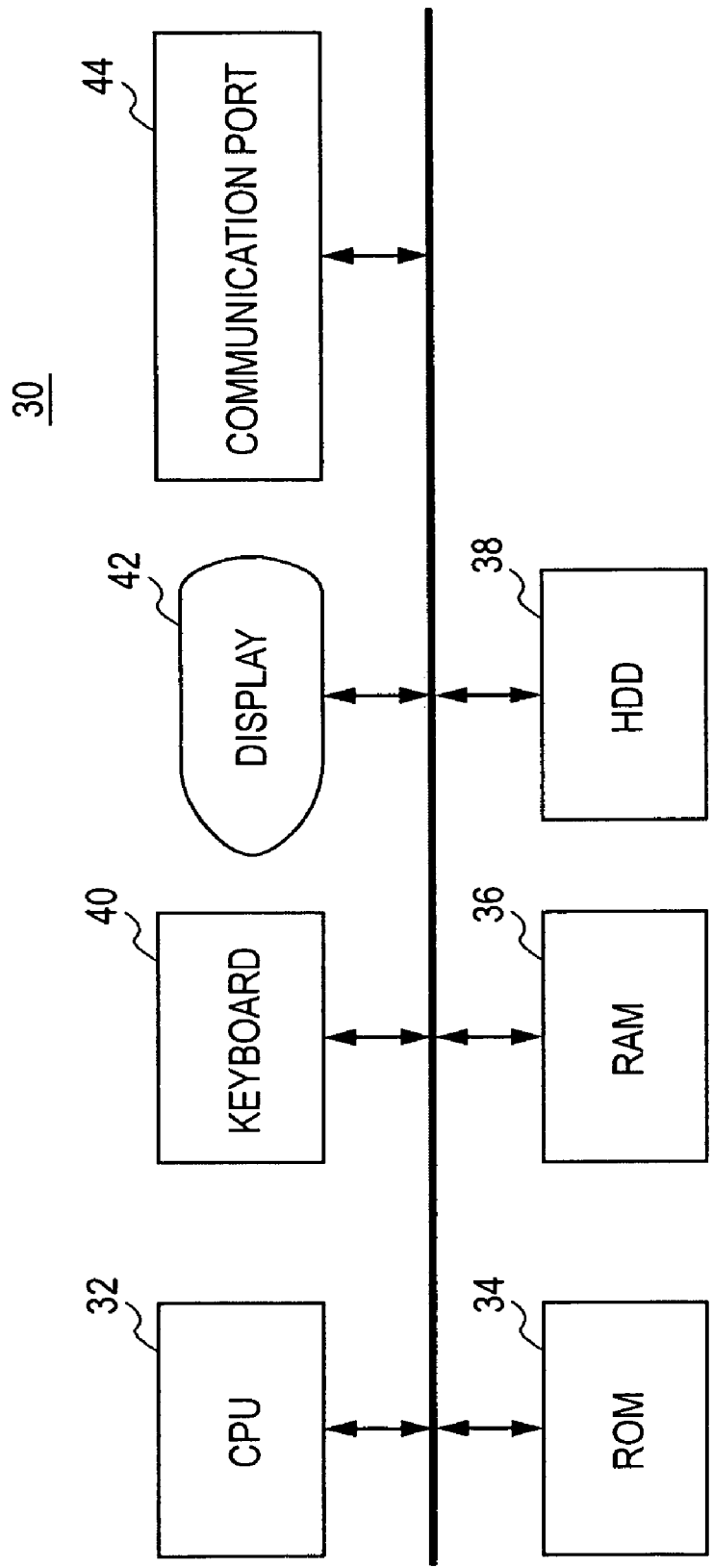
FIG. 10 is a block diagram of an image signal processing apparatus according to an embodiment of the present invention.

FIG. 10 is a block diagram of an image signal processing apparatus 30 according to an embodiment of the present invention. The image signal processing apparatus 30 has a known hardware configuration. The image signal processing apparatus 30 includes a central processing unit (CPU) 32, a read-only memory (ROM) 34, a random access memory (RAM) 36, a hard disk drive (HDD) 38, a keyboard 40, a display 42, and a communication port 44.

The CPU 32 executes a program using the RAM 34 as a work area. The program is executed to implement various functions. For example, a grayscale conversion function is implemented as one of the effects applied to an image. The RAM 36 is used as an area for executing an operation system and an application program.

The HDD 38 stores the operation system and the application program. The ROM 34 stores a basic input/output system (BIOS) program for input and output control with respect to peripheral devices.

The ROM 34 and the HDD 38 may also be used to store boundary values at levels of error diffusion. The boundary values are determined by the method described above. The boundary values are stored as a portion of a device driver or a portion of an application program.

The boundary values may also be stored in a semiconductor memory (including a memory card), an optical disk, or any other storage medium. The boundary values may also be stored in an external storage device (or recording medium).

The keyboard 40 is an input device used by a user to input instructions or information to a computer. Another input device is, for example, a mouse. The display 42 is an output device for displaying a user interface designed using graphic components such as buttons and menu.

The user can instruct processing to be performed by the image processing apparatus 30 via the user interface view. The communication port 44 performs communication between the CPU 32 connected thereto via an internal bus and an ink jet printer.

The image signal processing apparatus 30 and the ink jet printer may be connected via a network using a network protocol compatible device as the communication port 44. The communication method may be wire or wireless communication.

The image signal processing apparatus 30 may be a general-purpose computer, a portable information terminal device incorporating a computer, a portable phone, a game device, an image pickup device, or any other electronic device.

The image signal processing apparatus 30 does not need to perform gamma correction, which largely changes the input/output characteristic, and more exact grayscale conversion to the original data can therefore be realized. Thus, the image conversion characteristic can be improved.

OTHER EMBODIMENTS

In the foregoing description, the characteristic curve by which boundary values at levels of error diffusion are defined is linear (see FIG. 8). However, the characteristic curve is not necessarily linear. For example, gamma characteristics shown in FIG. 11 may be used.

In FIG. 11, a line G-1 plotted with square indications is a basic characteristic curve (linear), and a curve G-3 plotted with triangular indications is a characteristic curve by which highlighted portions with low grayscale values are expanded and high-density portions with high grayscale values are compressed. A curve G-4 plotted with cross indications is a characteristic curve by which the highlighted portions and the high-density portions are expanded while storing change of mid-level tones. A curve G-2 plotted with round indications is a characteristic curve by which the highlighted portions are compressed and the high-density portions are expanded.

In the printer and image processing apparatus according to the embodiments described above, boundary values at levels of error diffusion are determined based on one characteristic curve and are stored. However, a plurality of sets of boundary values determined based on the plurality of characteristic curves shown in FIG. 11 may be stored. In this case, the set of boundary values corresponding to a characteristic curve specified based on the details of image processing or a characteristic curve selected by the user can selectively be used for error diffusion.

What is claimed is:

1. A method for setting a boundary value at a level of error diffusion, comprising:
   defining a characteristic curve on a coordinate plane, the coordinate plane being defined by a first axis indicating a perceptually uniform scale based on one of chromatic tristimulus values obtained by printing grid patterns, using a printing apparatus, the grid patterns having a certain area defined by a tone value defining a boundary value at each level for each color and a second axis indicating grayscale values of original data;
   determining a boundary value at a level of error diffusion based on the characteristic curve; and
   printing, utilizing a printing apparatus, an image corresponding to the error-diffusion onto a medium.

2. An image signal processing method comprising the steps of:
   reading a boundary value at a level of error diffusion from storing means, the boundary value being determined based on a characteristic curve defined on a coordinate plane, the coordinate plane being defined by a first axis indicating a perceptually uniform scale based on one of chromatic tristimulus values obtained by printing grid patterns, using a printing apparatus, the grid patterns having a certain area defined by a tone value defining a boundary value at each level for each color and a second axis indicating grayscale values of original data;
   error-diffusing input image data using the read boundary value; and
   printing, utilizing a printing apparatus, an image corresponding to the error-diffusion onto a medium.

3. An image signal processing apparatus comprising:
   a storage unit that stores a boundary value at a level of error diffusion, the boundary value being determined based on a characteristic curve defined on a coordinate plane, the coordinate plane being defined by a first axis indicating a perceptually uniform scale based on one of chromatic tristimulus values obtained by printing grid patterns having a certain area defined by a tone value defining a boundary value at each level for each color and a second axis indicating grayscale values of original data; and
   an error diffusion unit that error-diffuses input image data using the boundary value.

4. A printing apparatus comprising:
   a storage unit that stores a boundary value at a level of error diffusion, the boundary value being determined based on a characteristic curve defined on a coordinate plane, the coordinate plane being defined by a first axis indicating a perceptually uniform scale based on one of chromatic tristimulus values obtained by printing grid patterns having a certain area defined by a tone value defining a boundary value at each level for each color and a second axis indicating grayscale values of original data;
   an error diffusion unit that error-diffuses input image data using the boundary value; and
   a printing device that prints an image corresponding to the error-diffused image data onto a printed medium.

* * * * *